United States Patent
Olthoff et al.

[15] 3,680,892
[45] Aug. 1, 1972

[54] CUSHION HITCH LEVELING VALVE LINKAGE

[72] Inventors: James A. Olthoff, South Holland; Roger M. Smith, Joliet; Jack H. Trittipoe, Elwood, all of Ill.

[73] Assignee: Caterpillar Tractor Co., Peoria, Ill.

[22] Filed: March 22, 1971

[21] Appl. No.: 126,687

[52] U.S. Cl..................................280/489, 280/492
[51] Int. Cl............................B62d 53/02, B60d 1/00
[58] Field of Search...............................280/489, 492

[56] References Cited

UNITED STATES PATENTS

| | | | |
|---|---|---|---|
| 3,118,686 | 1/1964 | McAdams | 280/65 |
| 3,135,529 | 6/1964 | Conrad | 280/489 |
| 3,311,389 | 3/1967 | Barton et al. | 280/489 |
| 3,321,216 | 5/1967 | Carter | 280/489 |
| 3,430,657 | 3/1969 | Junck et al. | 280/489 X |

*Primary Examiner*—Leo Friaglia
*Attorney*—Fryer, Tjensvold, Feix, Phillips & Lempio

[57] ABSTRACT

A linkage has three joints for transmitting arcuate motion in any plane to a control element to push and pull the control element linearly along the longitudinal axis of the control element. One joint is fixed. One joint is pinned. One joint is a ball joint type. The one fixed joint coupled with the fact that the control element is free to rotate allows the linkage to both push and pull in any plane.

3 Claims, 4 Drawing Figures

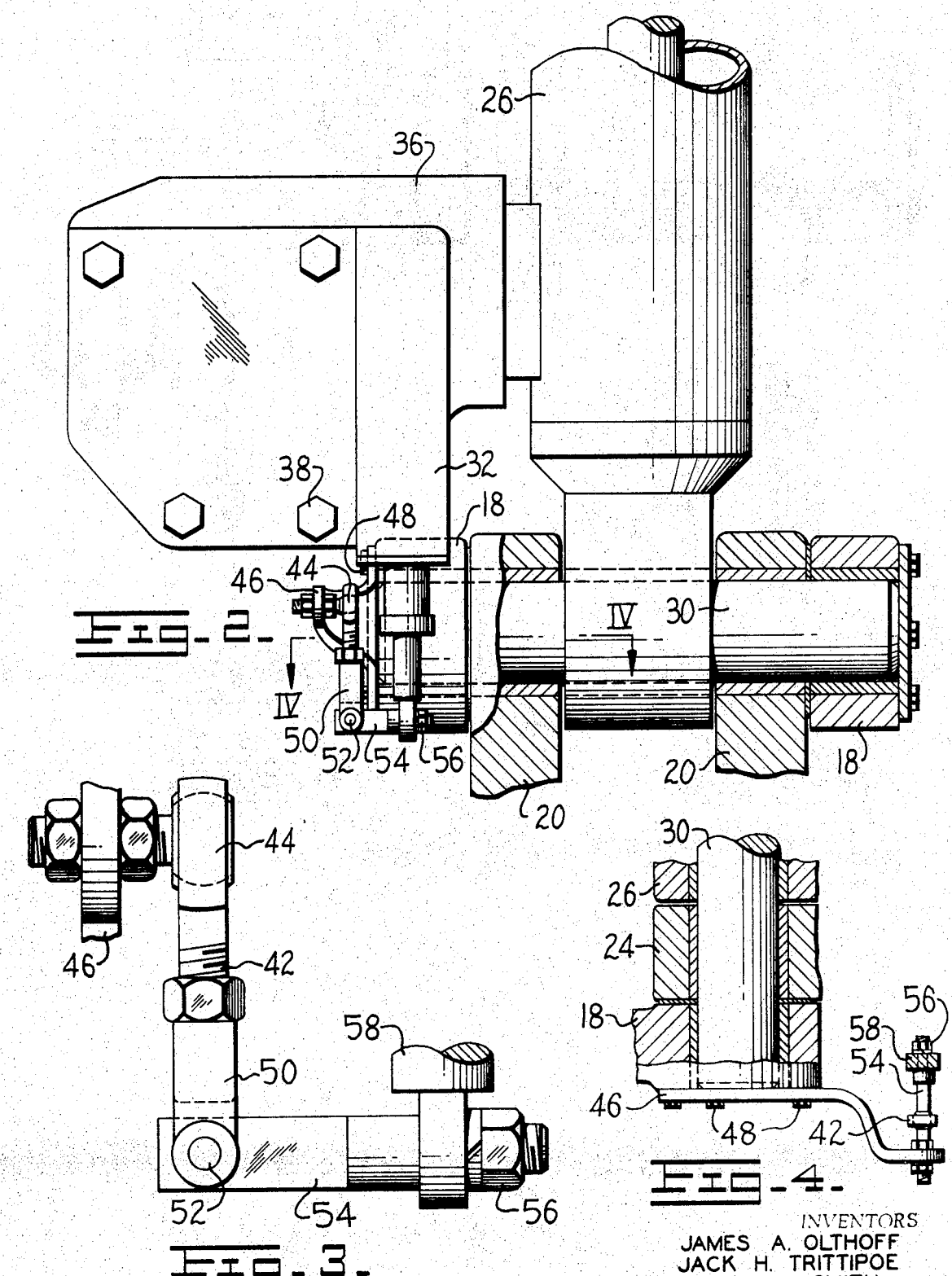

CUSHION HITCH LEVELING VALVE LINKAGE

This invention relates particularly to a specific linkage for the leveling valve of a cushion hitch scraper. The linkage allows the transmission of motion in any plane to sense the relative positions of the hitched components.

A hitch structure for a tractor trailer scraper controls pitch and bounce. The vertical movement between the tractor and scraper is cushioned by a hydraulic cylinder in communication with a pair of accumulators. The hydraulic system employs an automatic leveling or control device to compensate for deflection of the spring mechanism which is caused by loading and unloading of the scraper.

To be most effective in cushioning, the position of the piston within the hydraulic cylinder should be an intermediate position with respect to the ends of the cylinder. Since this position varies greatly when the scraper is loaded and unloaded, the leveling or control device is provided to vary the effective volume of the oil in the cylinder and accumulators as the position of the parts tend to vary with variation in the load.

For a complete and detailed explanation of the cushioned hitch structure and leveling means reference is made to U.S. Pat. No. 3,311,389 to Barton et al. and to U.S. Pat. No. 3,430,657 to Junck et al.

The automatic leveling or control device which compensates for the deflection of the spring mechanism caused by loading and unloading of the scraper (as noted above) senses the relative motion between hitch components. A mechanical linkage transmits the relative motion between the hitch components to a control valve for the hydraulic cylinder.

In the prior art it has usually been possible to close couple the control valve with the part of the hitch structure used to indicate the relative movement (usually a lever), so that the mechanical linkage between the position sensing lever and the leveling valve could be relatively short.

Because of space limitations on certain size scrapers, it is now not possible to close couple the leveling valve with the position sensing lever. A special linkage must be provided. And this special linkage must accommodate the various relative positions of the hitch components.

The hitch has a trapezoidal configuration. The degrees of relative rotation resulting from manufacturing tolerances of the hitch can produce relative movement between the hitch components which make it difficult to transmit motion of the position sensing lever to the reciprocable member of the control valve.

It is an object of the present invention to construct a linkage that will enable arcuate movement of the control lever in any plane to be accurately transmitted to the control valve to push or pull the control valve in the direction required to compensate for the movement of the control lever.

It is a specific object of the present invention to construct a control linkage which has two links, a ball joint connection between one end of one link and the control lever, a fixed connection between one end of the other link and the valve stem of the control valve and a pin joint connection between the other ends of the two links whereby the lever can push and pull the valve stem in substantially any plane.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 2 is a fragmentary enlarged view, partly broken away to show details of construction, taken along the line and in the direction indicated by the arrows II—II in FIG. 1;

FIG. 3 is a fragmentary enlarged view taken along the line and in the direction indicated by the arrows III—III in FIG. 1;

FIG. 4 is a top plan view taken along the line and in the direction indicated by the arrows IV—IV in FIG. 2.

Figure 1:
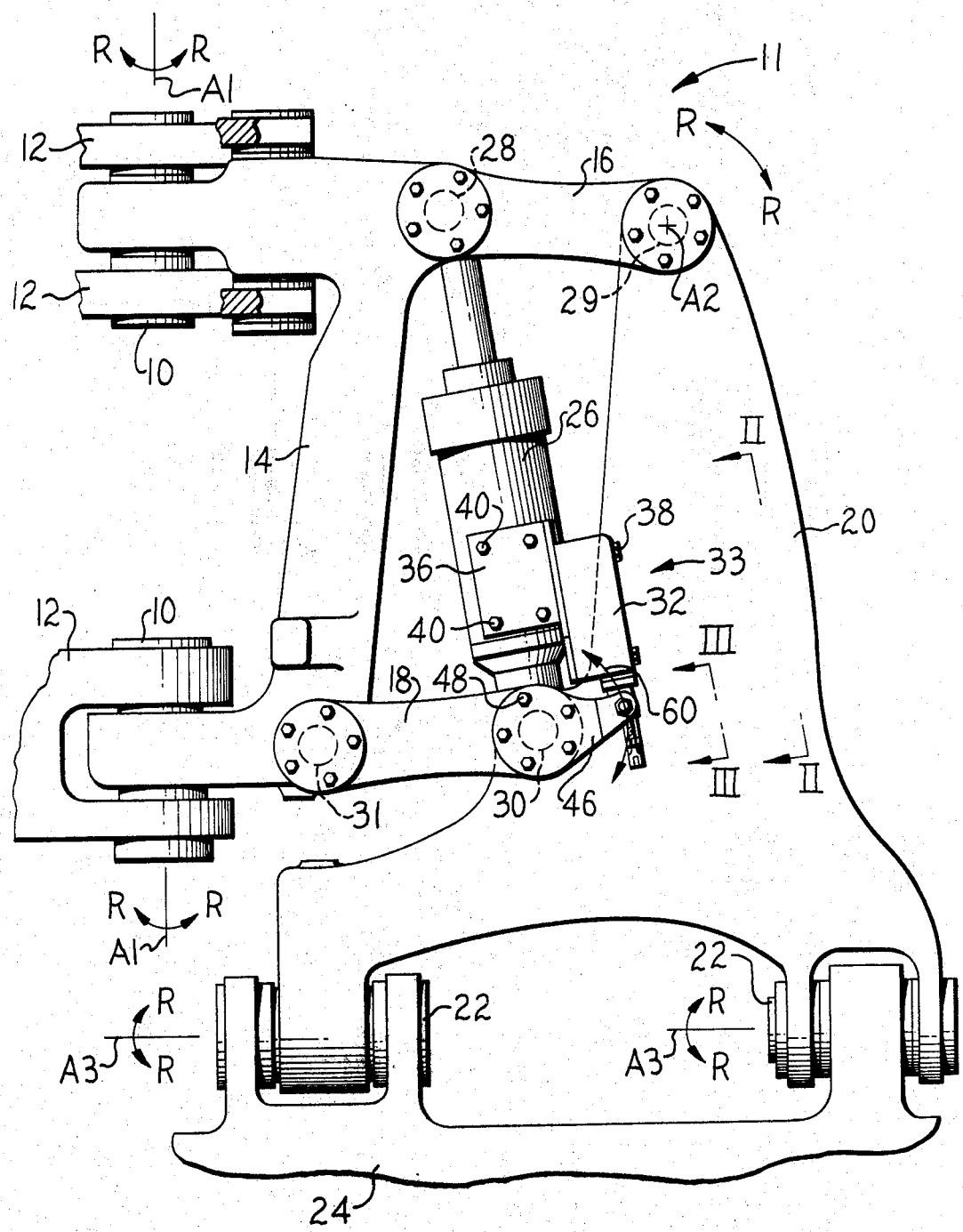
FIG. 1 is a side elevation view of an articulated cushion hitch for a tractor scraper connection incorporating a control linkage constructed in accordance with one embodiment of the present invention.

An articulated cushion hitch for a tractor scraper connection is indicated generally by the reference numeral 11 in FIG. 1.

The hitch 11 includes a gooseneck, portions of which are indicated by reference numeral 12.

The hitch 11 includes a bracket 14. The bracket 14 is connected to the gooseneck 12 by vertical pivots 10. The pivots 10 permit rotation about a vertically extending axis A 1 in the direction indicated by the arrows R.

The bracket 14 is pivotally connected by links 16 and 18 with a frame 20.

The frame 20 is pivoted by pin 22 on a horizontal axis with the tractor frame, portions of which are indicated by the reference numeral 24.

The pins 22 permit rotation about a horizontal axis A 3 in the direction indicated by the arrows R.

The links 16 and 18, bracket 14 and frame 20 form a trapezoidal connection with pivotal connections 28, 29, 30 and 31 at the corners of the trapezoid. The links 16 and 18 permit swinging movement about the pivots 28 and 29, 30 and 31 around the axis of the pivots, such as the axis A 2 with the pivot 29 and in the direction indicated by the arrows R about axis A 2. The trapezoidal connection permits vertical movement between the frame 20 and the bracket 14.

This vertical movement is cushioned by hydraulic cylinder 26. The hydraulic cylinder 26 is pivotally connected to the bracket 14 by the pivot 28 and to the frame 20 by the pivot 30.

A pair of accumulators, not shown, are in the hydraulic circuit for the cylinder to provide the cushioning effect.

As noted above, to be most effective in cushioning, the piston of the cylinder 26 must assume an intermediate position with respect to the ends of the cylinder. Since this position would vary greatly when the scraper is loaded from the position when the scraper is unloaded, the effective volume of the oil in the cylinder and accumulators must also vary as the position of the parts tend to vary with variation of load.

Leveling means, indicated generally by the reference numeral 33, coact with the trapezoidal linkage and the cylinder 26 to produce the required variation of oil volume with variation in the load in the scraper.

A more detailed explanation of the cushion hitch structure and leveling means described above is contained in U.S. Pat. No. 3,311,389 to Barton et al. and in U.S. Pat. No. 3,430,657 to Junck et al.

In the specific construction shown in FIGS. 1–4 of this application, the leveling means include a leveling valve 32 which is secured to a bracket 36 by bolts 38. The bracket 36 is secured to the cylinder 36 by a plurality of bolts 40.

The leveling means include a position indicating lever 46 which is secured to the link 18 by a plurality of bolts 48.

As best shown in FIG. 3, a link 42 is connected to the lever 46 by a ball joint 44.

As also best shown in FIGS. 2 and 3, the leveling valve 32 includes a downwardly extending rod 58 which is connected to the valve stem. The rod 58 is connected to a rod 54.

The rod 54 is connected to the link 42 by a pin joint connection 52.

The lower end of link 42 is a yoke 50 which straddles the rod 54 at the pin joint connection 52. The lower end 50 is also threaded on the upper end 42 so that the length of this link 42 can be adjusted at assembly.

The end of the rod 54 which is attached to the rod 58 is rigidly secured to the rod 58 by a nut 56.

The rod or valve stem 58 corresponds to the rod 27 disclosed in FIG. 1 of the above noted U.S. Pat. No. 3,430,657 to Junck et al.

It should be noted that the valve stem 58 can rotate within the valve housing.

Shifting of the rod or valve stem 58 longitudinally with respect to its axis selectively directs fluid to or exhausts fluid from the cylinder 26 and accumulators as described in the above mentioned patents to Barton et al. and Junck et al.

In operation, relative movement of the bracket 14 with respect to the frame 20 causes the link 18 and the attached lever 46 to rotate about the pivot 30. This action is transmitted by the link 42 and the rod 54 to the rod 58. This shifts the valve stem within the valve 32.

The arcuate movement of the ball joint 44 about the pivot 30, as shown by the line 60 in FIG. 1, offsets the longitudinal axis of the link 42 rearward with respect to the longitudinal axis of the rod 58, as viewed in FIG. 3.

The specific combination of (1) the ball joint 44, (2) the pin joint 52 and the fixed relation of the ball joint 44, (3) pin joint 52 and the fixed relation of the rod 54 to the rod 58, and (4) the fact that the rod 58 can rotate within the valve 32, constitutes a stable working arrangement. This arrangement permits pushing and pulling of the rod 58 regardless of the relationship of the lever 46 with respect to the rod 58.

The pin joint 52 and the ball joint 44 permit angular misalignment in a direction substantially normal to the longitudinal axis of the tractor. This misalignment occurs during the movement of the lever 46 and also occurs because of lateral movement of the load cylinder 26 during normal operation of the scraper. The misalignment results from normal clearances and manufacturing tolerances.

The subject linkage must also compensate for longitudinal movement of the load cylinder 26. During such longitudinal movement of the load cylinder 26 the cylinder changes angular relationship to the link 18 during normal operation of the scraper.

The freedom of the linkage with the specific combination of joint connections and the fact that the rod 58 can rotate compensate for all relative movement between the various hitch components. This specific arrangement also provides a stable linkage which is capable of accurately transmitting angular changes in the linkage to the leveling valve 32.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In an articulated cushion hitch for a tractor scraper connection of the kind having an extensible hydraulic strut for providing both cushioning during movement and leveling during changes in loading and wherein the articulated connection accommodates rotation about the three major axes and vertical movement of the scraper with respect to the tractor, a control valve for controlling the extension of the strut in response to the load in the scraper and including a valve stem mounted for both reciprocatory and rotary motion about the axis of the valve stem, a lever operatively associated with the scraper for indicating the vertical position of the scraper with respect to the tractor, and linkage means connected to the lever and the valve stem, said linkage means including two links, a ball joint connection between one end of one link and the lever, a fixed connection between one end of the other link and valve stem, and a pin joint connection between the other ends of the two links whereby the lever can push and pull the valve stem in substantially any plane.

2. A linkage for transmitting arcuate motion in any plane to a control element to push and pull the control element linearly along the longitudinal axis of the control element and comprising, a lever movable about an axis of rotation to produce the arcuate motion, a mounting means for the control element which permits rotation of the control element as well as reciprocation of the control element about said longitudinal axis, said mounting means being fastened in a fixed position with respect to the axis of rotation of the lever, a first link and a second link, a ball joint connection between the lever and one end of the first link, a fixed connection between the control element and one end of the second link, and a pin joint connection between the other ends of the first and second links.

3. A linkage as defined in claim 2 including a four member pin joint connected trapezoidal connection and an extensible strut connected across diagonally spaced pin joints of the trapezoidal connection and wherein the lever is one member of the four member pin joint connected trapezoidal connection and the control element is a valve stem of a control valve mounted on the extensible strut.

* * * * *